Figure 1:
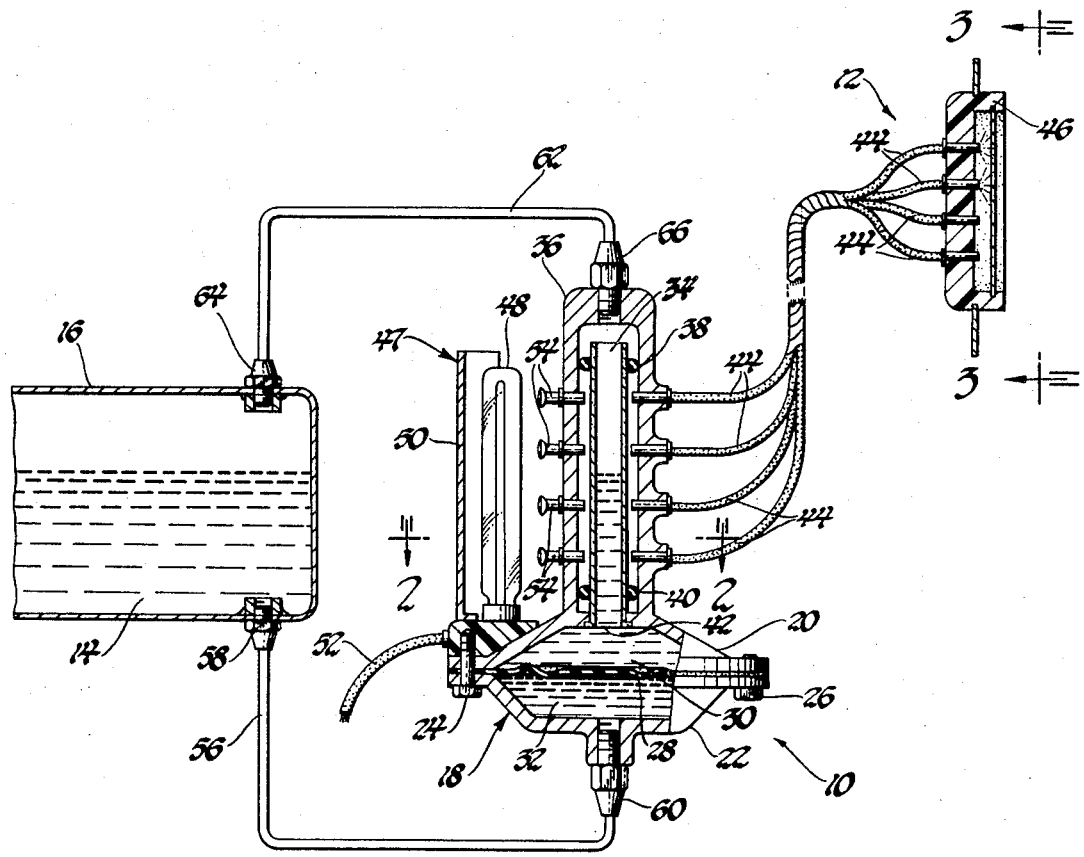

United States Patent [19]
Kind

[11] 3,713,338
[45] Jan. 30, 1973

[54] FIBER OPTIC LIQUID LEVEL INDICATOR

[75] Inventor: Ronald W. Kind, Detroit, Mich.

[73] Assignee: General Motors Corporation, Detroit, Mich.

[22] Filed: Jan. 18, 1971

[21] Appl. No.: 107,080

[52] U.S. Cl. .......................73/293, 73/299, 73/323
[51] Int. Cl. ..........................G01f 23/02, G01f 23/14
[58] Field of Search........73/293, 327, 323, 347, 307; 350/319; 137/557; 116/118 R; 73/299

[56] References Cited

UNITED STATES PATENTS

| | | | |
|---|---|---|---|
| 2,696,738 | 12/1954 | Lupfer | 73/299 |
| 1,670,578 | 5/1928 | Joyce | 73/299 |
| 1,259,680 | 3/1918 | Theobold | 73/299 |
| 3,005,345 | 10/1961 | Kaufman et al. | 73/327 |
| 3,466,928 | 9/1961 | Kind | 73/293 |
| 1,955,315 | 4/1934 | Styer | 73/293 |
| 3,120,125 | 2/1964 | Vasel | 73/293 |
| 3,505,868 | 4/1970 | Goellner | 73/293 |

FOREIGN PATENTS OR APPLICATIONS

| | | | |
|---|---|---|---|
| 779,928 | 4/1935 | France | 73/299 |

*Primary Examiner*—Louis R. Prince
*Assistant Examiner*—Daniel M. Yasich
*Attorney*—Jean L. Carpenter and Paul Fitzpatrick

[57] ABSTRACT

A fluid level indicator in which a fluid reservoir is divided into two fluid chambers by a flexible diaphragm. The first chamber is filled with a light absorbing fluid and the second chamber is connected to a container containing a fluid whose level is to be indicated so that the fluid is supplied to the second chamber at a pressure which corresponds to the level of the fluid in the container. An upright transparent vessel is mounted over an opening in the first chamber through which fluid may pass into the vessel. The pressure of the fluid in the second chamber due to the level of the fluid in the container exerts a force on the diaphragm to force the light absorbing fluid in the first chamber through the opening into the upright transparent vessel to a level at which the fluid pressures acting on each side of the diaphragm are equal. The ends of a series of fiber optic members are vertically aligned adjacent to the transparent vessel and the remaining ends are terminated at a remote viewing station. The fiber optic members are illuminated by a light source positioned opposite the ends of the fiber optic members and external to the transparent vessel. The fiber optic members in the region above the light absorbing fluid in the vessel are illuminated to provide an indication at the remote station of the level of the fluid in the container.

1 Claim, 3 Drawing Figures

PATENTED JAN 30 1973

3,713,338

INVENTOR.
Ronald W. Kind
BY
Paul Fitzpatrick
ATTORNEY

FIBER OPTIC LIQUID LEVEL INDICATOR

This invention relates to liquid level indicators and more specifically to a liquid level indicator utilizing fiber optic light conducting elements. The utilization of light conducting fiber optic members in fluid level indicators is known. An example of such an indicator is shown in U.S. Pat. No. 3,466,928 issued Sept. 16, 1969. In utilizing this form of fiber optic liquid level indicator, either the fluid whose level is to be indicated must be a light absorbing fluid or the fluid must be colored or dyed to provide for adequate light absorption.

It is the general object of this invention to provide for a liquid level indicator utilizing fiber optic light conducting elements.

It is another object of this invention to provide for a fiber optic liquid level indicator which is independent of the light absorption qualities of the liquid whose level is to be indicated.

These and other objects of this invention are accomplished by utilizing a reservoir which is divided into two chambers by a flexible diaphragm. An upright transparent vessel is mounted over an opening in the first chamber which is filled with a light absorbing fluid. The ends of one or more fiber optic members are positioned adjacent to the transparent vessel and are illuminated by a lamp which is positioned oppositely therefrom and adjacent to the transparent vessel. Fluid whose level in the container is to be detected is supplied to the second chamber to exert a pressure on the diaphragm which is moved to move fluid from the first chamber into the transparent vessel to a level where the fluid pressures acting on each side of the diaphragm are equal. The fiber optic members in the region above the light absorbing fluid in the vessel are illuminated by the light source. The light absorbing fluid in the vessel absorbs the light in the region below its level so that the fiber optic members in the region below the level of the fluid in the vessel remain non-illuminated.

Figure 2:
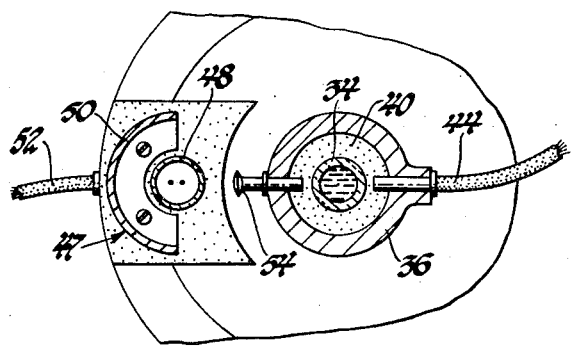
Figure 3:
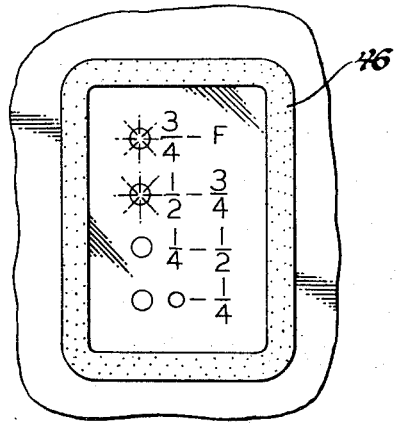

The invention will be best understood by reference to the following description of a preferred embodiment and the accompanying drawings in which:

FIG. 1 generally illustrates an apparatus according to the invention for detecting the level of fluid in a container;

FIG. 2 is a detailed cross-sectional view taken along the lines 2—2 of FIG. 1; and FIG. 3 is a view of the remote viewing station as taken along the lines 3—3 of FIG. 1.

Referring to FIG. 1, an indicator 10 is shown for indicating at a remote viewing station 12 the level of a fluid 14 in a container 16. The container 16, may be, for example, a fuel tank, a vehicle crankcase or a vehicle radiator containing, respectively, gasoline, oil or water. These examples are cited for illustration purposes only. Other examples will be obvious to one skilled in the art.

The indicator 10 is comprised of a reservoir 18 which is formed by the members 20 and 22 which are secured to one another by the threaded fasteners 24 and 26. Clamped between the members 20 and 22 is a flexible diaphragm 28 which divides the reservoir 18 into a chamber 30 and a chamber 32.

Referring to FIGS. 1 and 2, a cylindrical transparent vessel 34 is mounted within the upright structure 36 of the member 20 and is positioned therein by the resilient seal members 38 and 40. An opening 42 in the member 20 provides for fluid communication between the chamber 30 and the transparent vessel 34.

Adjacent to the transparent vessel 34, a series of fiber optic light conducting members 44 are linearly arranged and are mounted within the upright structure 36 so that the ends of the fiber optic members 44 are directed at right angles to the transparent vessel 34. The opposite ends of the fiber optic members 44 extend to the remote viewing station 12 where a display panel 46 is provided to hold the fiber optic members 44 in a vertical linear array with the uppermost fiber optic member at the display panel 46 corresponding to the uppermost fiber optic member mounted in the structure 36 and the other fiber optic members arranged in like order. It is not necessary that the fiber optic members 44 at the display panel 46 be arranged in either a vertical or linear array so long as the pattern is meaningful.

A light structure 47 is mounted on the member 20 of the reservoir 18 and is secured thereto by the threaded fastener 24. The light structure 46 is comprised of a lamp 48 and a reflector 50, both of which are oppositely disposed from the ends of the fiber optic members 44 which are secured in the structure 36. The lamp 48 receives power through a power cable 52 from a suitable power source.

Light gathering lenses 54 are mounted within the structure 36 and with the ends thereof terminating adjacent to the transparent vessel 34 and oppositely disposed from the ends of the fiber optic members 44 also mounted within the structure 36. Each of the light gathering lenses 54 gathers the light from the lamp 46 and the reflector 50 and directs the light to the corresponding oppositely disposed fiber optic member 44.

Referring again to FIG. 1, the chamber 30 in the reservoir 18 is filled with a light absorbing fluid. A conduit 56 has one end connected to the container 16 by a threaded fastener 58 and the other end connected to the member 22 of the reservoir 18 by a threaded fastener 60. The conduit 56 supplies a portion of the fluid 14 to the chamber 32 of the reservoir 18. To vent gases which may be entrapped in the chamber 32, a vent line (not shown) may be used to vent those gases in a manner well known to those skilled in the art. As can be seen, the fluid pressure acting on the diaphragm 28 from within the chamber 32 is directly related to the level of the fluid 14 within the container 16. Therefore, as the level of the fluid 14 within the container 16 increases, the pressure acting on the diaphragm 28 from within the chamber 32 increases to move the diaphragm and consequently a portion of the light absorbing fluid within the chamber 30 into the transparent vessel 34. The diaphragm is moved until the fluid pressure acting on the diaphragm 28 from within the chamber 30 equals the fluid pressure acting on the diaphragm 28 from within the chamber 32. At this point, the level of the light absorbing fluid within the transparent vessel 34 directly corresponds to the level of the fluid 14 within the container 16. As shown in FIG. 1, for illustration purposes, the level of the light absorbing fluid is between the second and third fiber optic members 44 which level is determined by the level of the fluid 14. Consequently, the light directed towards the ends of the fiber optic members 44 from the light gathering lens 54 is sensed by the two uppermost fiber optic members 44 to illuminate the corresponding two upper fiber optic members 44 at the display panel 46. Due to the light absorbing qualities of the light absorbing fluid within the chamber 30, the light directed toward the two lowermost fiber optic members 44 by the corresponding light gathering lens 54 is absorbed, resulting in the two lowermost fiber optic members 44 at the display panel 46 being extinguished. Therefore, as can be seen, the fiber optic members are illuminated to provide a direct indication of the level of the fluid 14 within the container 16 by detecting the level of the light absorbing fluid within the transparent vessel 34.

The display panel 46 may take the form as shown in FIG. 3. In the specific example shown in FIG. 1, the two uppermost fiber optic members are illuminated to indicate that the level of the fluid 14 in the container 16 is between one-half and three-quarters. When the level of the fluid 14 in the container decreases to just below one-half, the next lower fiber optic member will be illuminated to indicate that the level of the fluid is between one-quarter and one-half.

Referring again to FIG. 1, in the event that the space above the fluid 14 in the container 16 is not always at atmospheric pressure, a conduit 62 having one end connected to the upper portion of the container 16 by a threaded member 64 and the other end connected to the upper portion of the structure 36 by a threaded member 66 may be utilized to equalize the pressure within the upper portion of the transparent vessel 34 and the container 16.

Although the preferred embodiment as previously described used four fiber optic light conducting members, it will be obvious to one skilled in the art that a greater number of fiber optic light conducting members may be used to improve the resolution of the level indicator.

It can be seen, that since the fluid within the chamber 30 is isolated from the fluid within the chamber 32 and the container 16, the indicator is independent of the light absorbing qualities of the fluid whose level is to be detected. In addition, this isolation permits the utilization of a fluid within the chamber 30 having a specific gravity either greater or less than the specific gravity of the fluid 14 within the container 16 so that for a given change in the level of the fluid 14 within the container 16, the change in the level of the light absorbing fluid within the transparent vessel 34 will be respectively less than or greater than that change in level by a factor corresponding to the difference between the specific gravities of the fluid. For example, if the fluid 14 within the container 16 has a specific gravity X and the fluid within the chamber 30 has a specific gravity XY, the level of the fluid in the transparent vessel 34 will be equal to 1/Y times the level of the fluid 14 in the container 16.

If it is desired to place the indicator 10 within the container 16, the member 22 can be eliminated and the light structure 47 and the lenses 54 can be replaced by fiber optic light conducting members which would be mounted opposite the light conducting members 44 to conduct light from an external source to illuminate the fiber optic members 44.

What is claimed is:
1. A liquid level indicator for indicating the level of a fluid in a container, the fluid having a specific gravity X comprising a reservoir having first and second chambers separated by a flexible pressure responsive member, the first chamber containing a light absorbing fluid having a specific gravity XY; an upright transparent vessel mounted in a casing and having fluid communication with the first chamber; means for transferring a portion of the fluid in the container to the second chamber at a pressure corresponding to the level and the specific gravity X of said fluid in the container to move the pressure responsive member to transfer the light absorbing fluid from the first chamber to the vessel at a level equal to 1/Y times the level of the fluid in the container; a plurality of fiber optic light conducting members linearly disposed vertically in said casing, each of said fiber optic members having a first end terminating adjacent to said transparent vessel and a second end terminating at a remote viewing station, a plurality of fiber optic member having a light gathering end linearly disposed vertically in said casing with the other end thereof terminating adjacent to said transparent vessel and positioned oppositely of each of said first ends, and means for selectively illuminating region above the light absorbing fluid being illuminated thereby, the light absorbing fluid absorbing the light in the region below its level in the vessel to prevent illumination of the fiber optic members in said region below its level, whereby the level of the fluid in the container is indicated by the selective illumination of the fiber optic members at the remote viewing station.

* * * * *

PO-1050
(5/69)

UNITED STATES PATENT OFFICE
CERTIFICATE OF CORRECTION

Patent No. 3,713,338                    Dated January 30, 1973

Inventor(s) Ronald W. Kind

It is certified that error appears in the above-identified patent and that said Letters Patent are hereby corrected as shown below:

Column 4, line 41, after "illuminating", insert -- the fiber optic members according to the level of the fluid in the container comprising means positioned near said light gathering end for illuminating said first end of the fiber optic members through the vessel, the fiber optic members in the --.

Signed and sealed this 21st day of August 1973.

(SEAL)
Attest:

EDWARD M. FLETCHER, JR.
Attesting Officer

RENE D. TEGTMEYER
Acting Commissioner of Patents